(12) United States Patent
Vega et al.

(10) Patent No.: US 11,884,170 B1
(45) Date of Patent: Jan. 30, 2024

(54) ADAPTER FOR ELECTRIC VEHICLE CHARGING CONNECTORS

(71) Applicant: EVject, Inc., American Fork, UT (US)

(72) Inventors: Erick Vega, Salt Lake City, UT (US); Kreg Peeler, Draper, UT (US); Andrew Deceuster, North Logan, UT (US)

(73) Assignee: EVject, Inc., American Fork, UT (US)

( * ) Notice: Subject to any disclaimer, the term of this patent is extended or adjusted under 35 U.S.C. 154(b) by 0 days.

(21) Appl. No.: 18/169,741

(22) Filed: Feb. 15, 2023

Related U.S. Application Data

(60) Provisional application No. 63/383,247, filed on Nov. 10, 2022.

(51) Int. Cl.
| | |
|---|---|
| *B60L 53/16* | (2019.01) |
| *H01R 13/639* | (2006.01) |
| *H01R 13/502* | (2006.01) |
| *H01R 13/629* | (2006.01) |
| *H01R 31/06* | (2006.01) |

(52) U.S. Cl.
CPC .......... *B60L 53/16* (2019.02); *H01R 13/5025* (2013.01); *H01R 13/62933* (2013.01); *H01R 13/639* (2013.01); *H01R 31/06* (2013.01); *H01R 2201/26* (2013.01)

(58) Field of Classification Search
CPC .......... B60L 53/10; B60L 53/16; B60L 53/30; B60L 53/62; H01R 13/5025; H01R 13/62933; H01R 13/639; H01R 31/06; H01R 2201/26
See application file for complete search history.

(56) References Cited

U.S. PATENT DOCUMENTS

| | | | | |
|---|---|---|---|---|
| 4,478,212 A | * | 10/1984 | Asano | A61B 1/00124 396/17 |
| 6,142,805 A | * | 11/2000 | Gray | H01R 13/5213 439/272 |
| 7,960,648 B2 | * | 6/2011 | McGinley | G06F 1/263 174/36 |
| 8,900,006 B2 | * | 12/2014 | Gaul | H01R 13/665 439/489 |
| 8,951,060 B2 | * | 2/2015 | Meyer-Ebeling | B60L 53/16 320/109 |
| 9,156,362 B2 | * | 10/2015 | Soden | B60L 3/04 |

(Continued)

*Primary Examiner* — Thanh Tam T Le
(74) *Attorney, Agent, or Firm* — Kirton McConkie; Brian Tucker

(57) ABSTRACT

An adaptor for electric vehicle charging connectors allows an EV to be shifted from park even though the charging connector is still connected to the charging port. As a result, a driver needs not leave the EV to unplug the charging connector. The adapter can include an inner portion housing inner charging pin portions and inner communication pin portions and an outer portion housing outer charging pin portions and outer communication pin portions. The adapter can also include a switching mechanism for selectively forming a connection between one of the outer communication pin portions and one of the inner communication pin portions. The outer charging pin portions and outer communication pin portions can be configured to separate from the inner charging pin portions and inner communication pin portions respectively when the outer portion of the adapter is separated from the inner portion of the adapter.

20 Claims, 19 Drawing Sheets

(56) References Cited

U.S. PATENT DOCUMENTS

| | | | | |
|---|---|---|---|---|
| 9,178,313 B2 * | 11/2015 | Nakajima | ............... | B60L 53/16 |
| 9,308,825 B2 * | 4/2016 | Hayashigawa | ......... | B60L 53/16 |
| 9,865,957 B2 * | 1/2018 | Makwinski | ............ | H01R 13/44 |
| 9,969,277 B2 * | 5/2018 | Williams | ................ | B60L 53/30 |
| 11,305,657 B2 * | 4/2022 | Akai | .......................... | H02J 7/00 |
| 11,628,746 B1 * | 4/2023 | Pill | ................... | H02J 7/007194 |
| | | | | 320/109 |
| 11,648,841 B2 * | 5/2023 | Niederl | ................... | B60L 53/18 |
| | | | | 320/109 |

\* cited by examiner

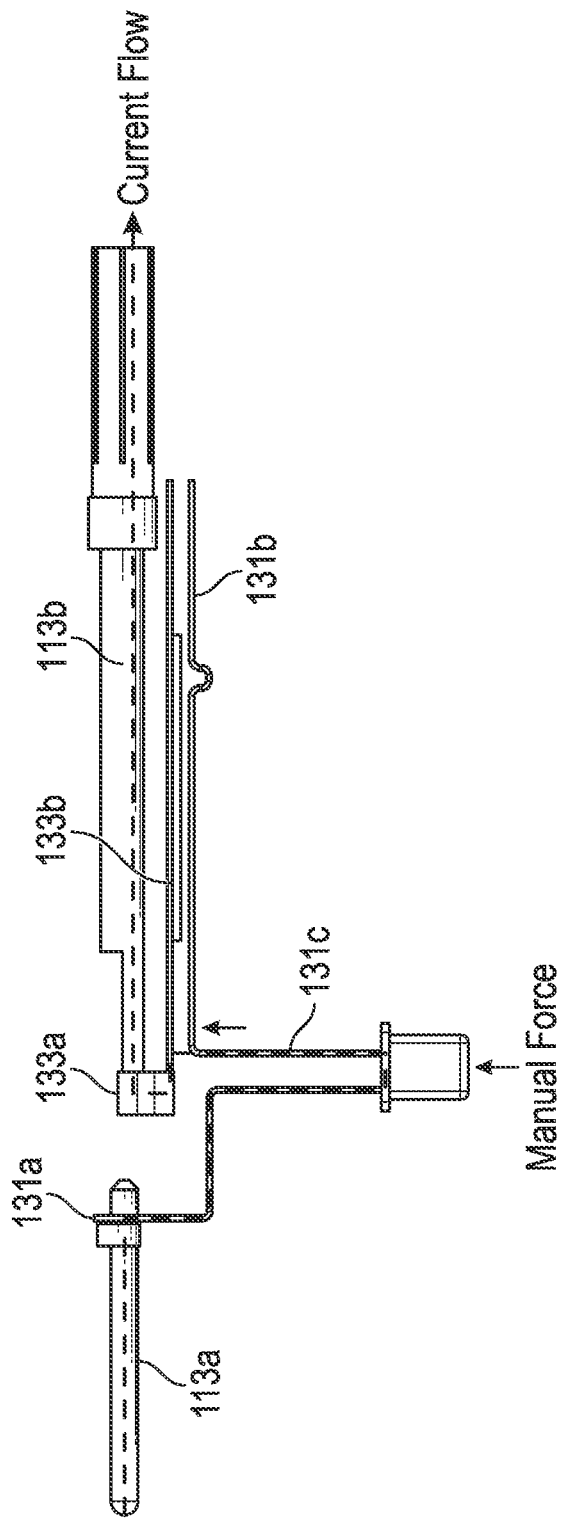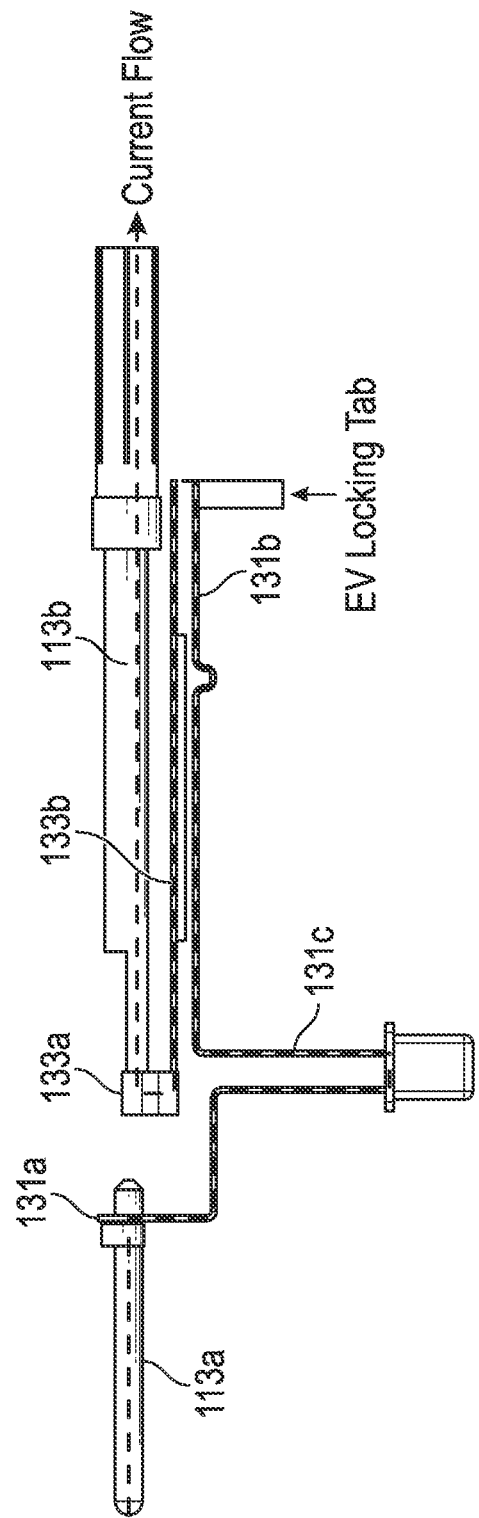

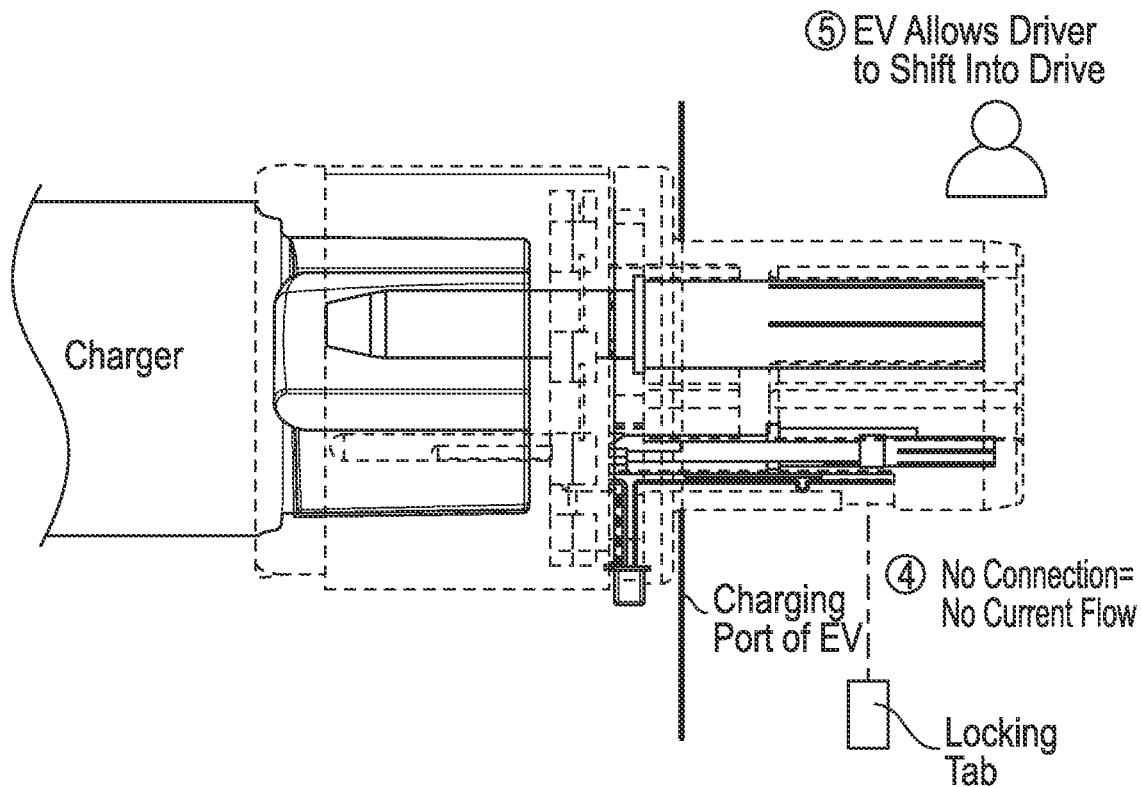
FIG. 4C
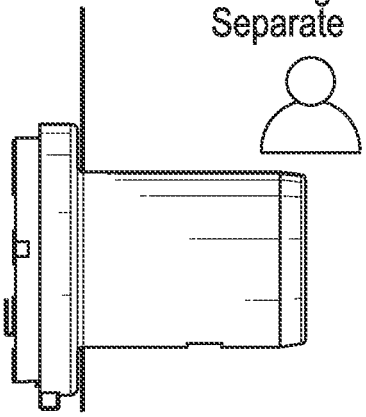
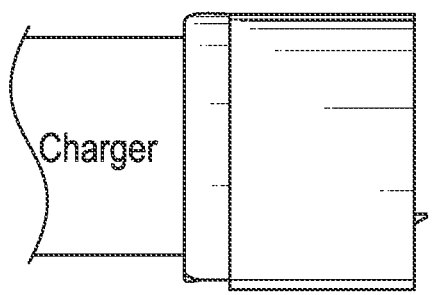
FIG. 4D

ADAPTER FOR ELECTRIC VEHICLE CHARGING CONNECTORS

CROSS-REFERENCE TO RELATED APPLICATIONS

This application claims the benefit of U.S. Provisional Patent Application No. 63/383,247 which was filed on Nov. 10, 2022.

BACKGROUND

Electric vehicles (or EVs), whether cars, trucks or otherwise, must be frequently recharged. For this purpose, EVs have charging ports that are typically located on the side of the EV. FIGS. 1A and 1B provide an example of a Tesla 10 that has a charging port 11 into which a charging connector 12 can be plugged. Charging connector 12 can be electrically connected to a power source such as a 240-volt outlet at home or a public charging station. Other makes of EVs have similar charging ports that require similar charging connectors.

It can take a relatively long time to fully charge an EV. For example, with a typical 240-volt at-home charger, a full charge may take 8 hours. Even with high-voltage superchargers, it usually takes at least 30-40 minutes to reach a full charge.

Most EVs are designed to prevent any motion of the EV while the EV is connected to a charger. Therefore, the vehicle must remain parked while connected to the charger and cannot be shifted to drive, reverse, or neutral. Additionally, current charger designs require manual removal of the charging connector from the charging port. This can create various difficulties. For example, if a driver is in a rush to leave, he or she may forget to unplug the charging connector before getting into the EV. Similarly, if a driver's hands are full, he or she may have difficulty removing the charging connector from the charging port and managing the storage of the charging cable.

Greater difficulties may arise in scenarios where the driver is waiting in the EV while it charges. For example, a thunderstorm or other severe weather could occur when charging is complete thus forcing the driver to brave the elements to unplug the EV. As another example, a charging station may be in a remote or dangerous location where it may be unsafe for the driver to exit the EV such as due to the presence of wildlife or a lurking assailant. In such cases, the driver will in essence be trapped inside the EV given that he or she cannot drive away until the EV is unplugged.

BRIEF SUMMARY

The present invention extends to an adaptor for electric vehicle charging connectors. The adapter allows an EV to be shifted from park even though the charging connector is still connected to the charging port. As a result, a driver needs not leave the EV to unplug the charging connector. The adapter can include an inner portion housing inner charging pin portions and inner communication pin portions and an outer portion housing outer charging pin portions and outer communication pin portions. In this context, the terms "inner" and "outer" are relative to the electric vehicle's charging port (i.e., the outer portions are positioned outward from the inner portions relative to the charging port). The adapter can also include a switching mechanism for selectively forming a connection between one of the outer communication pin portions and one of the inner communication pin portions. The outer charging pin portions and outer communication pin portions can be configured to separate from the inner charging pin portions and inner communication pin portions respectively when the outer portion of the adapter is separated from the inner portion of the adapter.

In some embodiments, the present invention may be implemented as an adapter for an electric vehicle that includes an inner portion configured to insert into a charging port of an electric vehicle, an outer portion configured to receive a charging connector for the electric vehicle and a switching mechanism that is configured to selectively form a connection between a first outer communication pin portion and a first inner communication pin portion.

In some embodiments, the switching mechanism may initially form the connection via manual force and subsequently form the connection via a locking tab of the electric vehicle.

In some embodiments, the inner portion may include inner charging pin portions and the outer portion may include outer charging pin portions that are connected to the inner charging pin portions. The outer charging pin portions may be configured to separate from the inner charging pin portions when the outer portion of the adapter separates from the inner portion of the adapter.

In some embodiments, the outer charging pin portions may be connected to the inner charging pin portions via a press fit.

In some embodiments, the outer charging pin portions may include charging strips and lugs.

In some embodiments, the lugs may be connected to the inner charging pin portions via a press fit.

In some embodiments, the inner portion may include multiple inner communication pin portions and the outer portion may include multiple outer communication pin portions that are connected to the inner communication pin portions. The outer communication pin portions may be configured to separate from the inner communication pin portions when the outer portion of the adapter separates from the inner portion of the adapter.

In some embodiments, the outer communication pin portions may include communication strips.

In some embodiments, the inner communication pin portions may include spring-loaded extensions.

In some embodiments, the switching mechanism may include a first contact component, a second contact component and a button for causing the first contact component to contact the second contact component to thereby form the connection between the first outer communication pin portion and the first inner communication pin portion.

In some embodiments, the inner portion of the adapter may include an opening through which a locking tab of the electric vehicle extends to force the first contact component into the second contact component.

In some embodiments, the adapter may also include a locking mechanism configured to secure the charging connector within the outer portion of the adapter.

In some embodiments, the locking mechanism may include an actuator that is actuated when the adapter is inserted into the charging port.

In some embodiments, the present invention may be implemented as an adapter for an electric vehicle that includes an inner portion configured to insert into a charging port of an electric vehicle, the inner portion including inner charging pin portions and inner communication pin portions, and an outer portion configured to receive a charging connector for the electric vehicle, the outer portion including outer charging pin portions and outer communication pin portions that are connected to the inner charging pin portions and inner communication pin portions respectively. The outer charging pin portions and outer communication pin portions may be configured to separate from the inner charging pin portions and inner communication pin portions respectively when the outer portion of the adapter is separated from the inner portion of the adapter.

In some embodiments, the adapter may include a switching mechanism that is configured to selectively form a connection between a first outer communication pin portion of the outer communication pin portions and a first inner communication pin portion of the inner communication pin portions.

In some embodiments, the outer charging pin portions may be connected to the inner charging pin portions via a press fit.

In some embodiments, the outer charging pin portions may be connected to the inner charging pin portions via charging strips.

In some embodiments, the outer communication pin portions may be connected to the inner communication pin portions via communication strips.

In some embodiments, the adapter may also include a locking mechanism configured to secure the charging connector within the outer portion of the adapter.

In some embodiments, the present invention may be implemented as an adapter for an electric vehicle that includes an inner portion that houses inner charging pin portions and inner communication pin portions, outer charging pin portions and outer communication pin portions. The inner charging pin portions and the inner communication pin portions are configured to separate from the outer charging pin portions and the outer communication pin portions respectively when the inner portion remains inserted in the electric vehicle as the electric vehicle drives away.

In some embodiments, the inner portion may form a breakaway portion of a housing of a charging connector for the electric vehicle.

In some embodiments, the outer charging pin portions and the outer communication pin portions may be housed in an outer portion of the adapter. The outer portion may be configured to receive a charging connector for the electric vehicle.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A and 3B show how the switching mechanism functions;

FIGS. 4A-4D provide an example of how the adapter allows the driver to shift from park while the charging connector remains connected to the charging port of an EV;

DETAILED DESCRIPTION

Figure 1A:
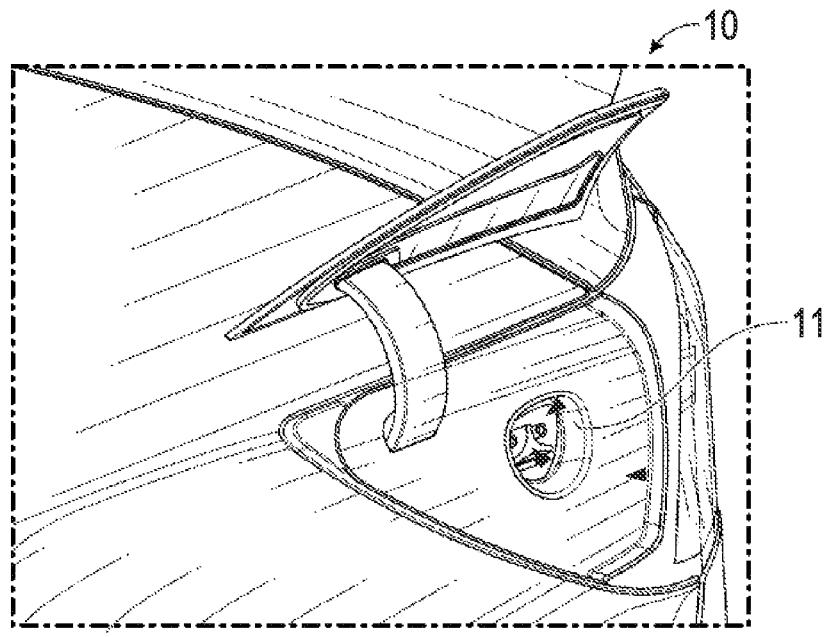
FIGS. 1A and 1B provide an example of an EV with which embodiments of the present invention could be used.
Figure 1B:
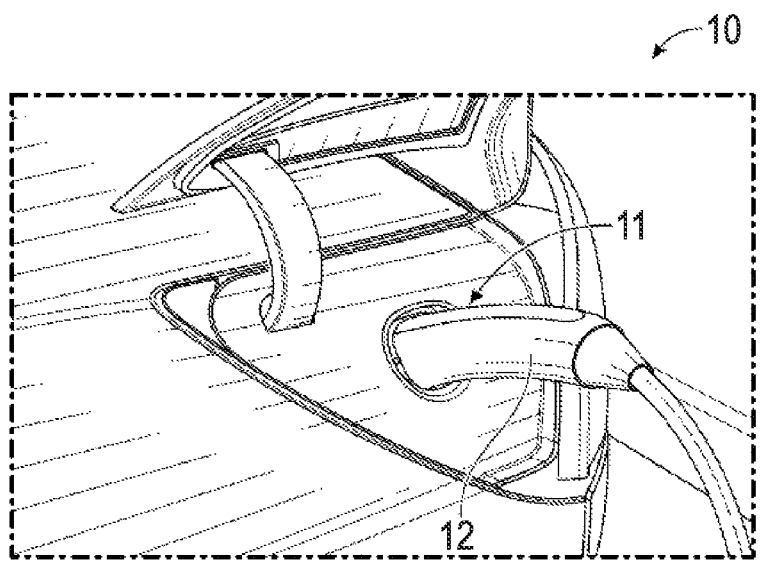

The present invention is directed to various types of adapters that can be used when charging an electric vehicle. Some of these adapters may be separate components from the charger. Others of these adapters may be integrated into the charger. In such cases, the charger could be integrated into a charging station or separate from the charging station.

FIGS. 2A-2F show an adapter 100 that is configured in accordance with embodiments of the present invention. Adapter 100 includes an outer portion 110 having an end 111 that is configured to receive a charging connector for an EV (i.e., it can be shaped to match a charging port of the EV) and an inner portion 120 having an end 121 that is configured to be inserted into a charging port of the EV (i.e., it can be shaped to match the charging connector for the EV). Adapter 100 as depicted is for a Tesla, but an adapter configured in accordance with embodiments of the present invention could include outer and inner portions that are customized for any other EV.

Figure 2A:
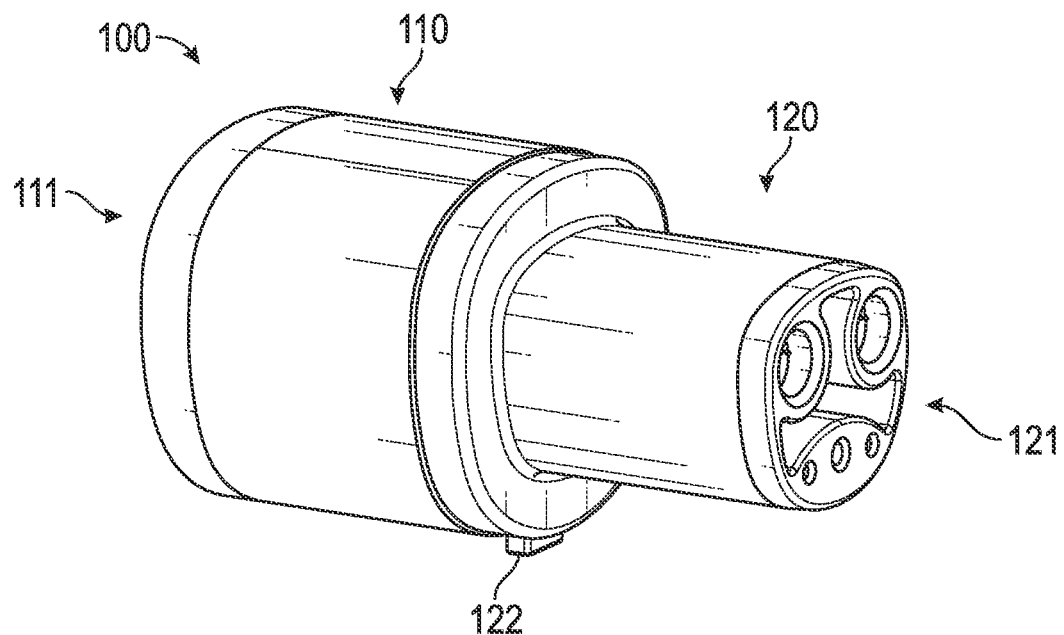
FIGS. 2A and 2B are front perspective and rear perspective views of an adapter that is configured in accordance with embodiments of the present invention.
Figure 2B:
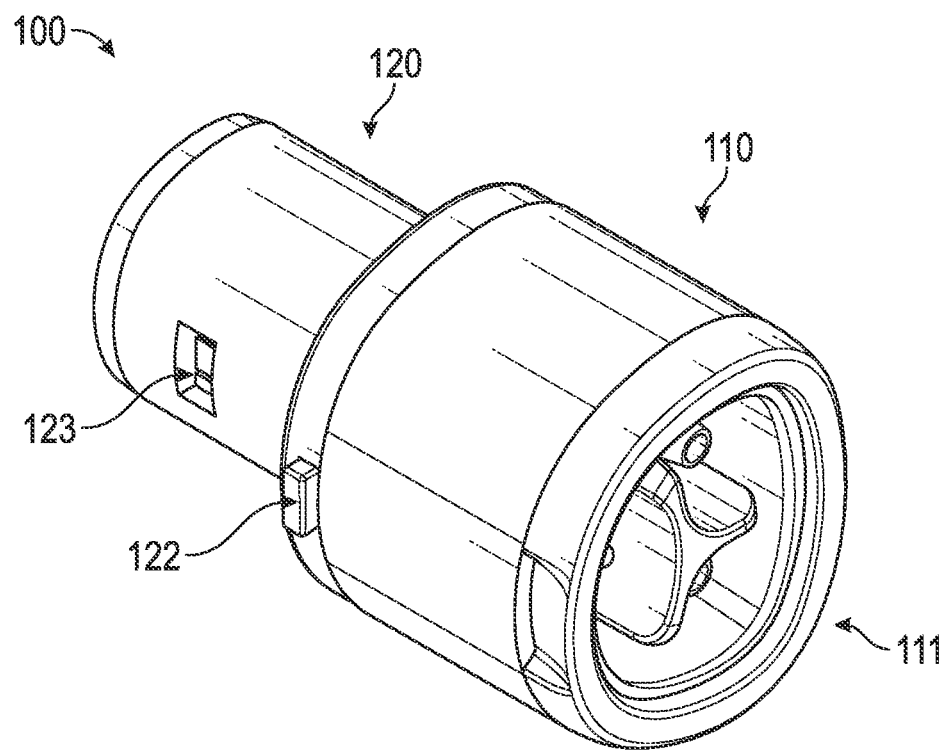

As shown in FIG. 2B, inner portion 120 can include an opening 123 that is configured to align with a locking tab (or other mechanism) of the EV's charging port so that the locking tab can insert into inner portion 120. A button (or other mechanism) 122 can also extend out from inner portion 120 (or possibly from outer portion 110) and can be pressed inwardly as described in detail below.

Figure 2C:
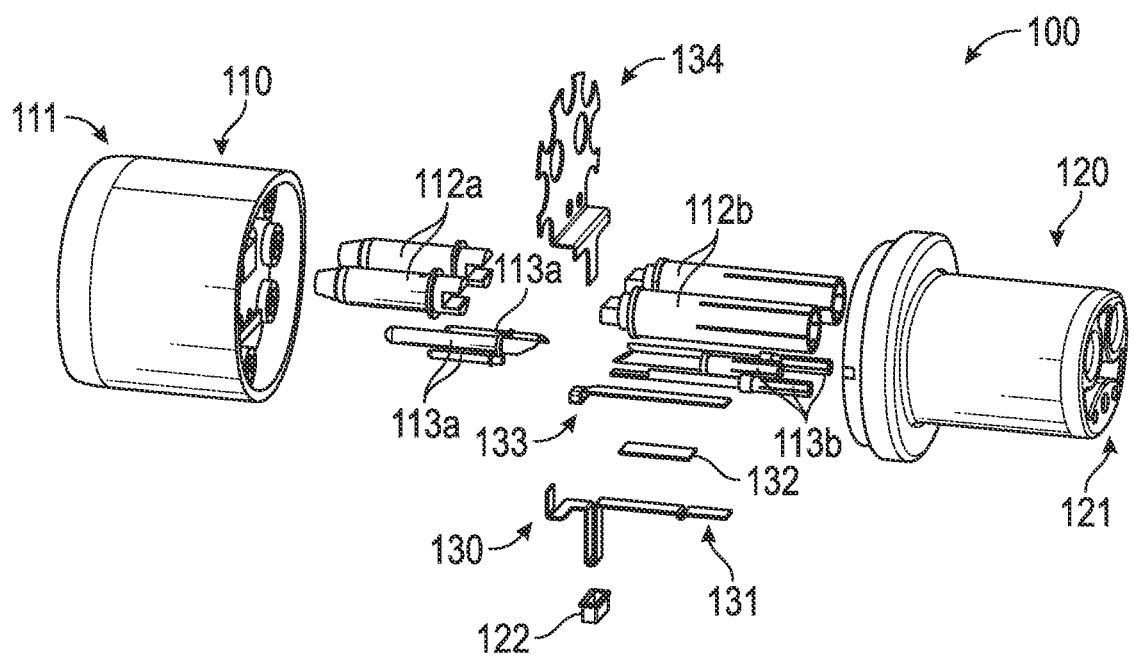
FIG. 2C is an exploded view of the adapter.
Figure 2D:
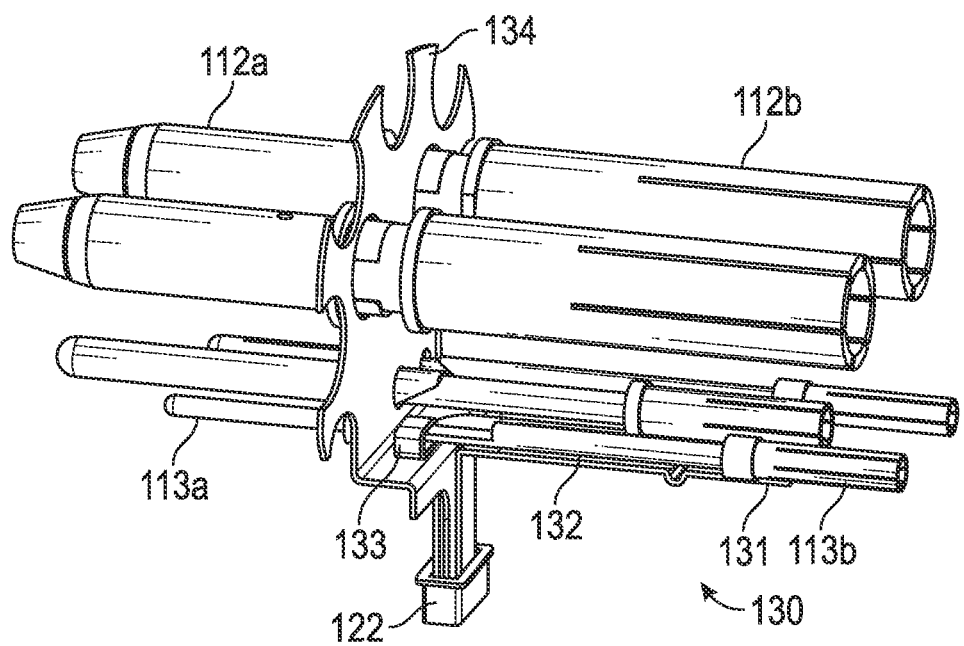
FIG. 2D shows the internal components of the adapter.

FIG. 2C is an exploded view of adapter 100, and FIG. 2D is an isolated view of the internal components of adapter 100. Outer portion 110 is separable from inner portion 120. For example, magnets (shown), breakable snaps, welding, adhesive, screws, or any other suitable connector or structure could be used to hold these portions together until forced apart as described below.

Adapter 100 can include charging pins (i.e., the pins used to supply voltage to the EV) which are formed by outer charging pin portions 112a that are housed in outer portion 110 and inner charging pin portions 112b that are housed in inner portion 120. In some embodiments, outer charging pin portions 112a and inner charging pin portions 112b may be connected together via a press fit or other mechanism that separates when outer portion 110 separates from inner portion 120. For example, in the depicted embodiments, inner charging pin portions 112b include protrusions that insert into channels in outer charging pin portions 112a.

Adapter 100 can also include communication pins (i.e., the pins used to sense the charging connector and/or to communicate with the charger) which are formed by outer communication pin portions 113a that are housed in outer portion 110 and inner communication pin portions 113b that are housed in inner portion 120. In some embodiments, two of the three outer communication pin portions 113a and two of the three inner communication pin portions 113b may be connected together via opposing angled surfaces (shown) or via any other mechanism that separates when outer portion 110 separates form inner portion 120. The third (or one of) outer communication pin portions 113a and the third (or one of) inner communication pin portions 113b can be selectively connected as described below.

Adapter 100 includes a switching mechanism 130 that selectively connects the outer communication pin portion 113a and the inner communication pin portion 113a. Switching mechanism 130 is configured to establish this connection when the driver (or other individual) manually presses button 122 to thereby cause the EV to detect that the charging connector is connected to the charging port. In response, the EV will cause the locking tab to be extended. The extension of the locking tab is intended to lock the charging connector in the charging port. However, because adapter 100 is inserted into the charging port and the charging connector is inserted into outer portion 110 of adapter 100, the locking tab will be extended into opening 123. The locking tab will maintain the connection formed by switching mechanism 130 thus ensuring that the EV believes the charging connector is connected to the charging port even after the driver stops pressing button 122. Then, when the driver instructs the EV to stop charging, which he or she may do while sitting in the EV, the EV will withdraw the locking tab. Once the locking tab is withdrawn, switching mechanism 130 will cease forming the connection to thereby cause the EV to believe the charging connector is no longer connected to the charging port which in turn will allow the driver to shift the EV from park without leaving the EV to remove the charging connector. The driver may then drive away to cause outer portion 110 to separate from inner portion 120. Outer portion 110 may remain attached to the charging connector to protect it as it may fall to the ground.

With reference to FIGS. 2C and 2D, switching mechanism 130 includes a first contact component 131, a second contact component 133, and an isolator 132 that is positioned between first contact component 131 and second contact component 133 to prevent them from inadvertently establishing a connection. First contact component 131 can be configured to move to contact second contact component 133 to selectively establish a connection between the respective outer communication pin portion 113a and inner communication pin portion 113b. Switching mechanism 130 may include a support member 134 that may support and separate the other components.

Figure 2E:
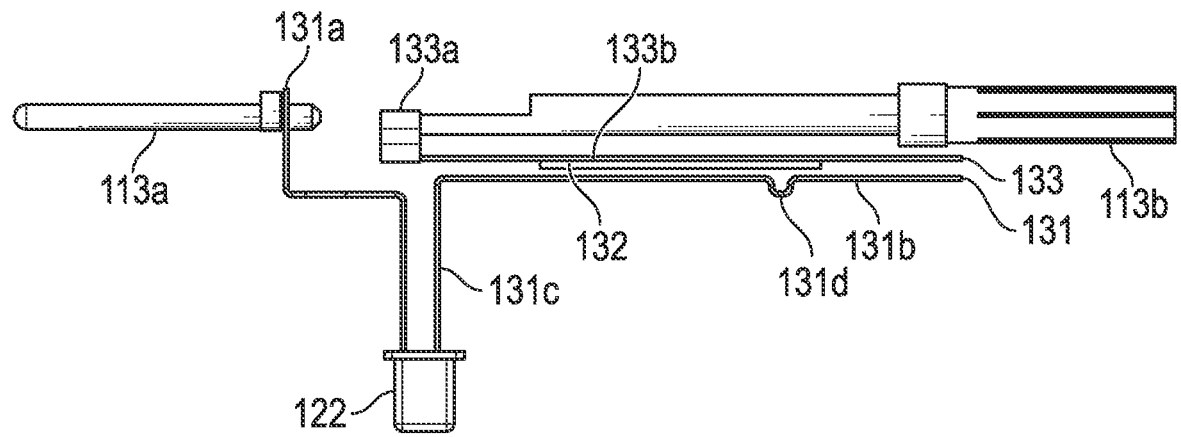
FIGS. 2E and 2F show a switching mechanism of the adapter.
Figure 2F:
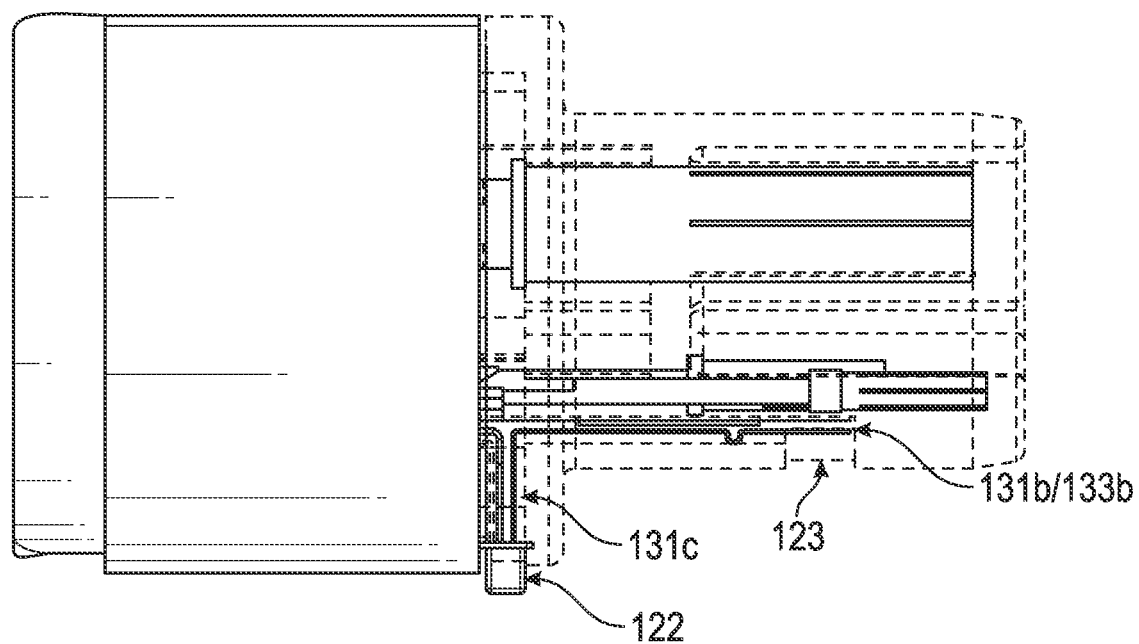
Figure 4A:
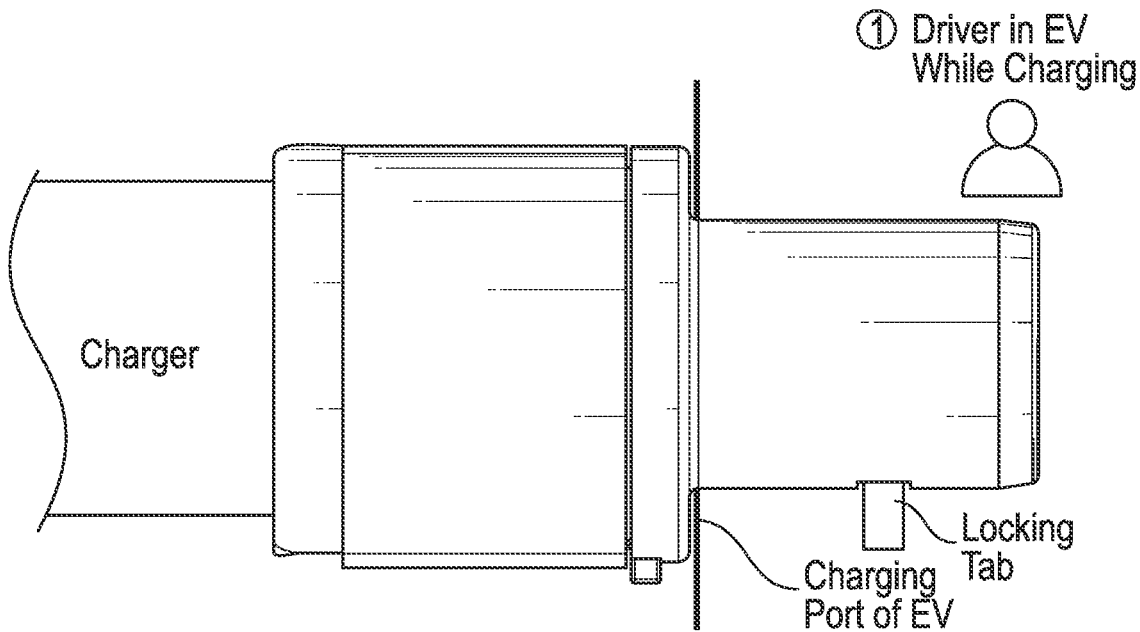
Figure 4B:
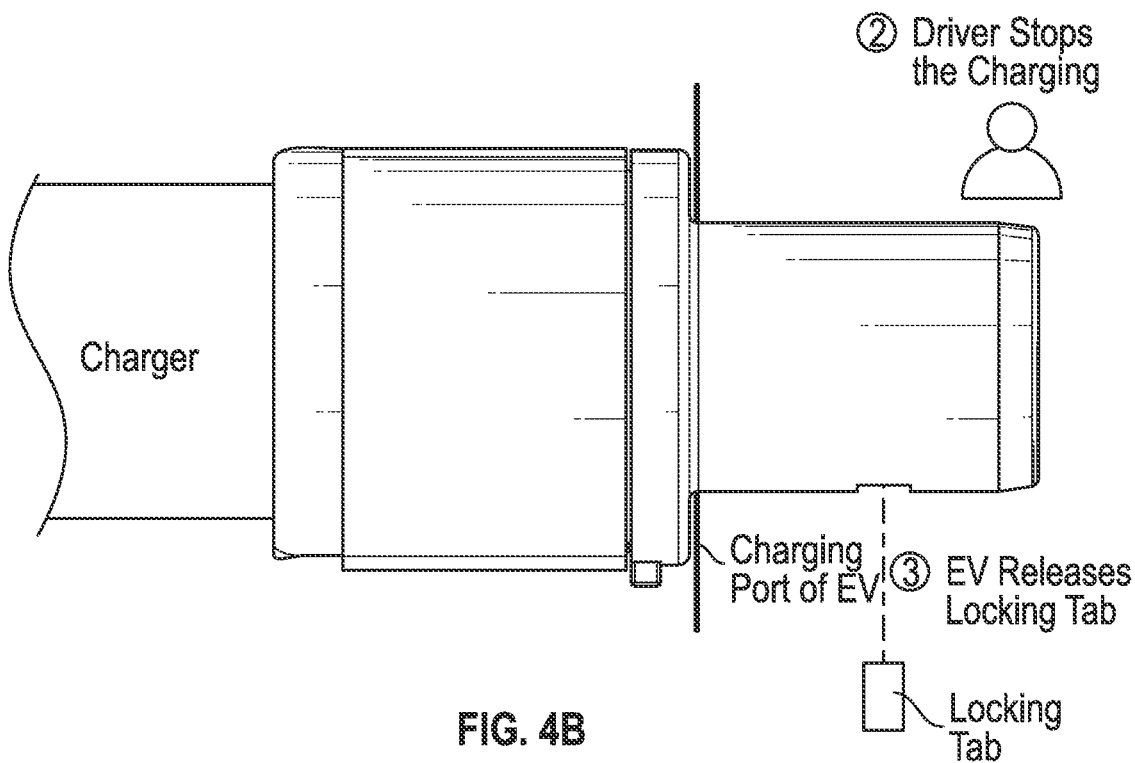

FIGS. 2E and 2F provide more detail of switching mechanism 130. First contact component 131 may include an outer contact portion 131a that is connected to outer communication pin portion 113a, an inner contact portion 131b that extends inwardly, and an extension 131c that interconnects outer contact portion 131a and inner contact portion 131b. Extension 131c may be configured to extend outwardly through inner portion 120 so that button 122 may be connected thereto. Inner contact portion 131b may include a spring 131d to facilitate the pivoting or movement of inner contact portion 131b.

Second contact portion 133 includes an outer contact portion 133a that is connected to inner communication pin portion 113b and an inner contact portion 133b that extends along but is spaced from inner contact portion 131b. Accordingly, a connection is established between outer communication pin portion 113a and inner communication pin portion 113b when inner contact portion 131b is forced into contact with inner contact portion 133b.

FIGS. 3A and 3B represent how switching mechanism 130 establishes and maintains a connection. In FIG. 3A, it is assumed that the driver has inserted inner portion 120 of adapter 100 into an EV's charging port and has inserted a charging connector into outer portion 110 of adapter 100. It is also assumed that the driver has applied a manual force on button 122 to cause inner contact portion 131b to be forced into contact with inner contact portion 133b thus allowing current to flow between outer communication pin portion 113a and inner communication pin portion 113b. Once this connection is established, the current flow will cause the EV to detect that the charging connector is connected to the charging port and to extend the locking tab. In FIG. 3B, the locking tab is shown as forcing inner contact portion 131b into contact with inner contact portion 133b thereby ensuring that current will continue to flow between outer communication pin portion 113a and inner communication pin portion 113b such that the EV will allow charging to occur.

FIGS. 4A-4D provide an example of how adapter 100 allows a driver to drive away while the charging connector remains connected to the charging port of the EV. In step 1 shown in FIG. 4A, the driver sits in the EV while the EV is charging. As shown, the locking tab is inserted into opening 123 to maintain the contact between inner contact portion 131b and inner contact portion 133b. In step 2, shown in FIG. 4B, the driver stops the charging (e.g., by pressing a button on the control screen), and in step 3, the EV releases the locking tab. In step 4 shown in FIG. 4C, the locking tab has retracted from opening 123 thereby allowing inner contact portion 131b to separate from inner contact portion 133b which in turn stops the current flow between outer communication pin portion 113a and inner communication pin portion 113b. This lack of current flow will cause the EV to believe the charging connector is no longer connected to the charging port even though it remains connected via adapter 100. Therefore, in step 5, the EV will allow the driver to shift into drive (or reverse). In step 6 shown in FIG. 4D, the driver drives away causing inner portion 120 to be separated from outer portion 110 while the charging connector remains inserted into outer portion 110 and inner portion 120 remains inserted into the charging port.

Figure 5:
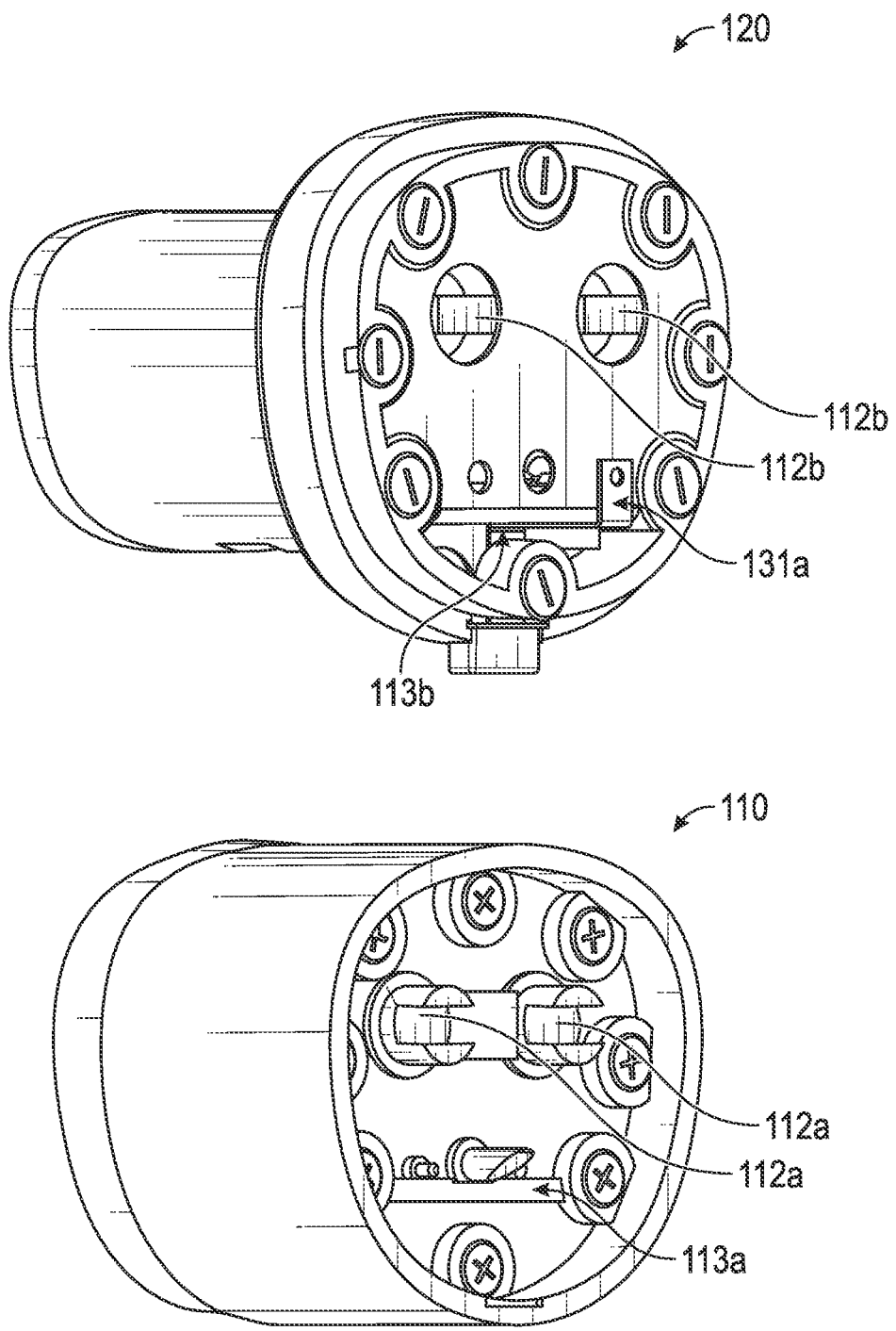
FIG. 5 shows how the adapter separates.

FIG. 5 shows outer portion 110 and inner portion 120 when separated from one another. As shown, outer charging pin portions 112a and outer communication pin portions 113a can cleanly separate from inner charging pin portions 113b and inner communication pin portions 113b respectively to minimize any damage to the EV or the charging station. In some embodiments, outer portion 110 and inner portion 120 could be configured to reconnect after separation so that adapter 100 could be reused.

Figure 6A:
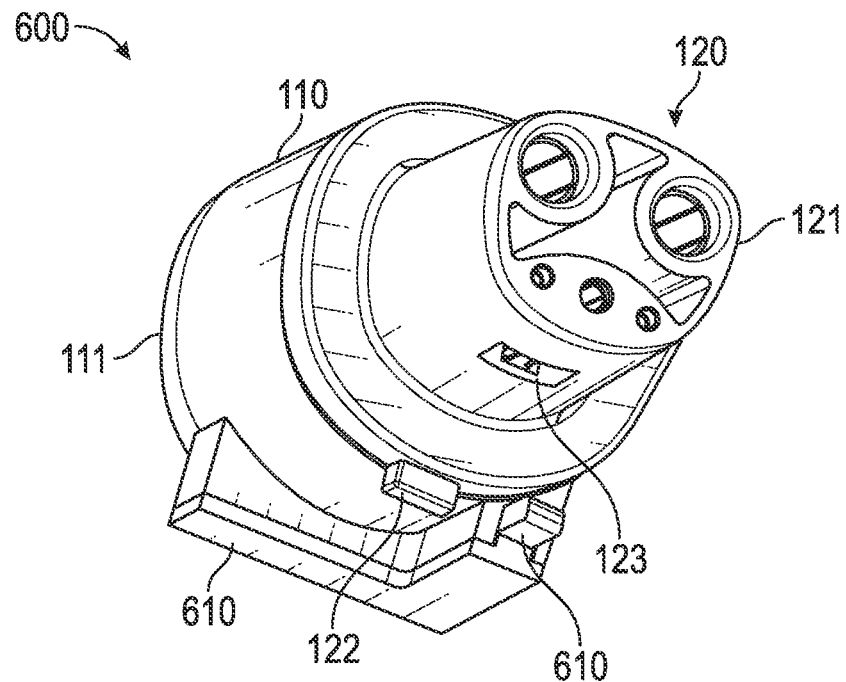
FIGS. 6A-6F are various views of another example of an adapter that is configured in accordance with embodiments of the present invention.
Figure 6B:
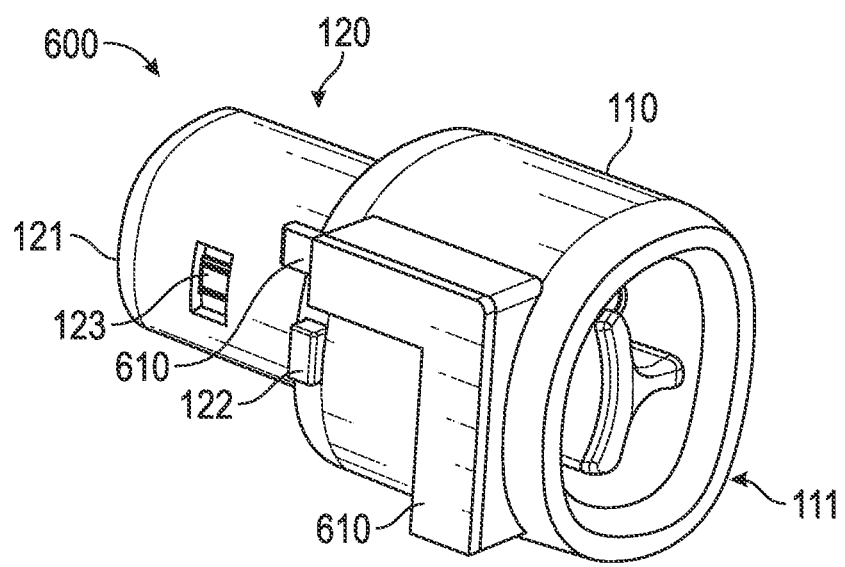

FIGS. 6A-6F show another adapter 600 that is configured in accordance with embodiments of the present invention. Adapter 600 is generally the same as adapter 100 but includes a locking mechanism 610 for locking the charging connector within outer portion 110. FIGS. 6A and 6B show that locking mechanism 610 may be formed along the bottom of outer portion 110.

Figure 6C:
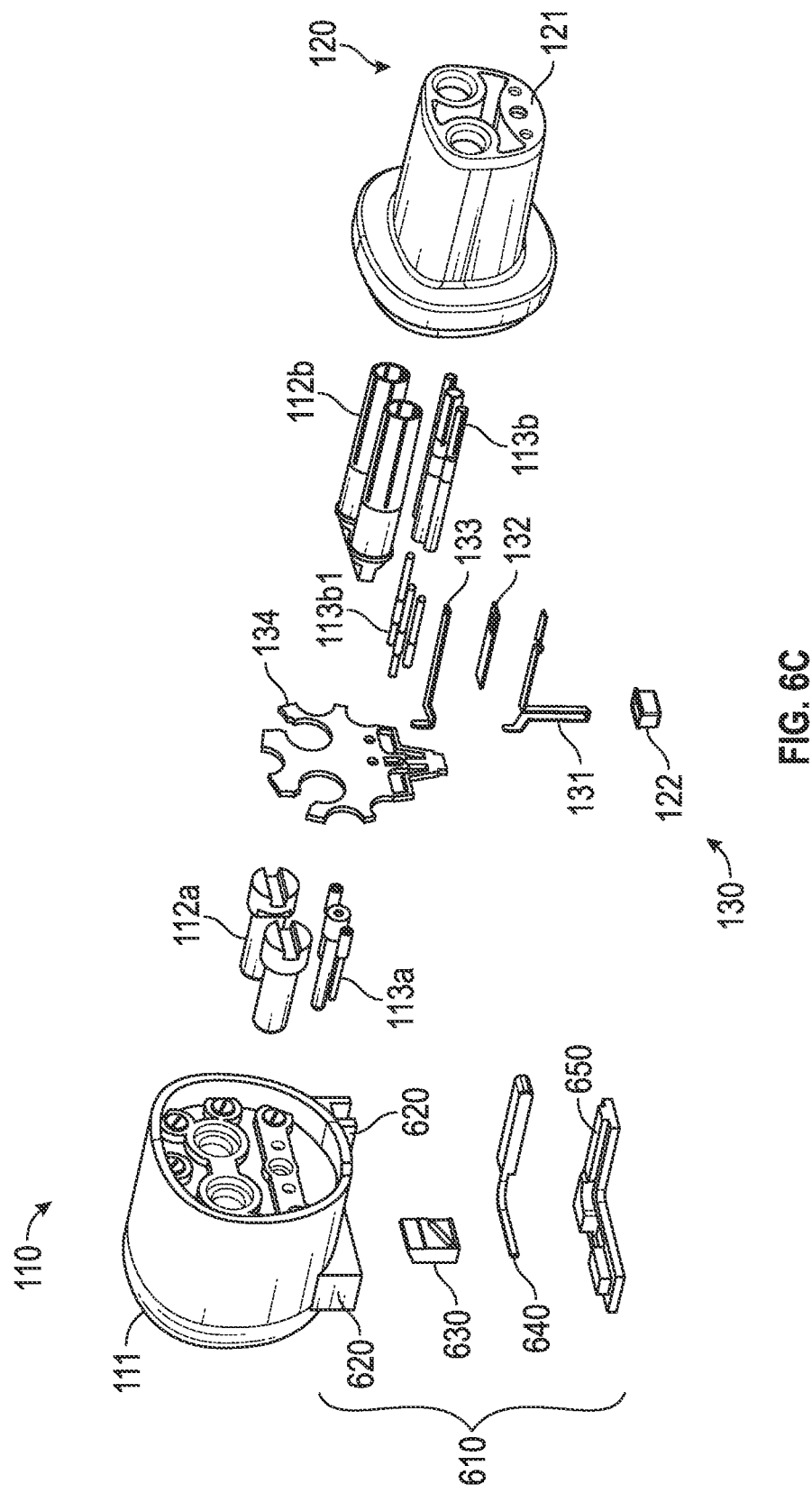

FIG. 6C is an exploded view of adapter 600 and shows that the internal components of adapter 600 are similar to those of adapter 100. However, in adapter 600, inner communication pin portions 113b include spring-loaded extensions 113b1 that form the respective electrical connections. In particular, the spring-loaded extension 113b1 of two of the three inner communication pin portions 113b extend through support member 134 and are biased against the corresponding outer communication pin portion 113a each of which may include a recess to increase the surface area of the connection. The spring-loaded extension 113b1 of the remaining inner communication pin portion 113b extends into second contact component 133.

Figure 6D:
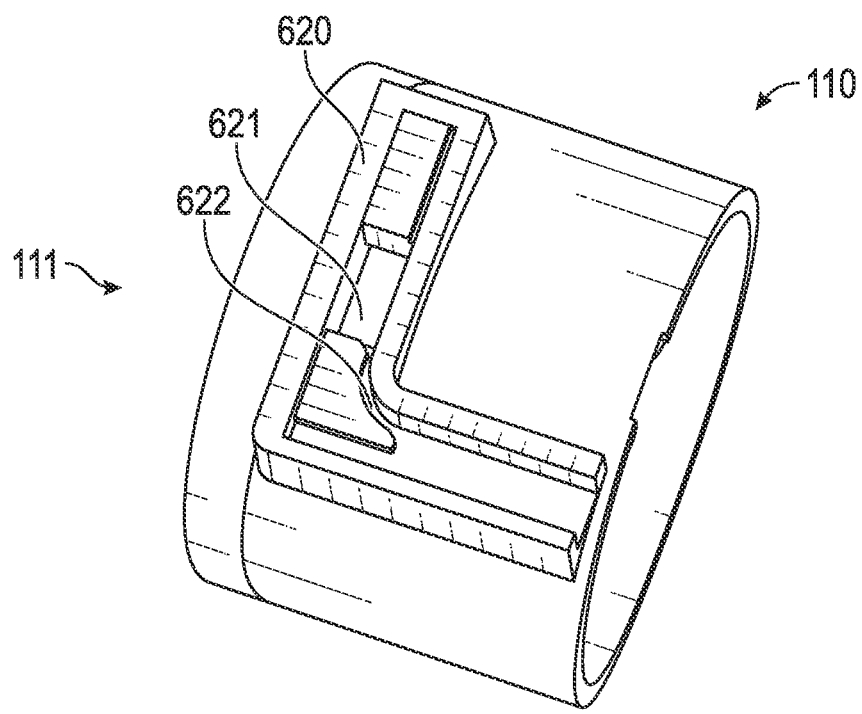
Figure 6E:
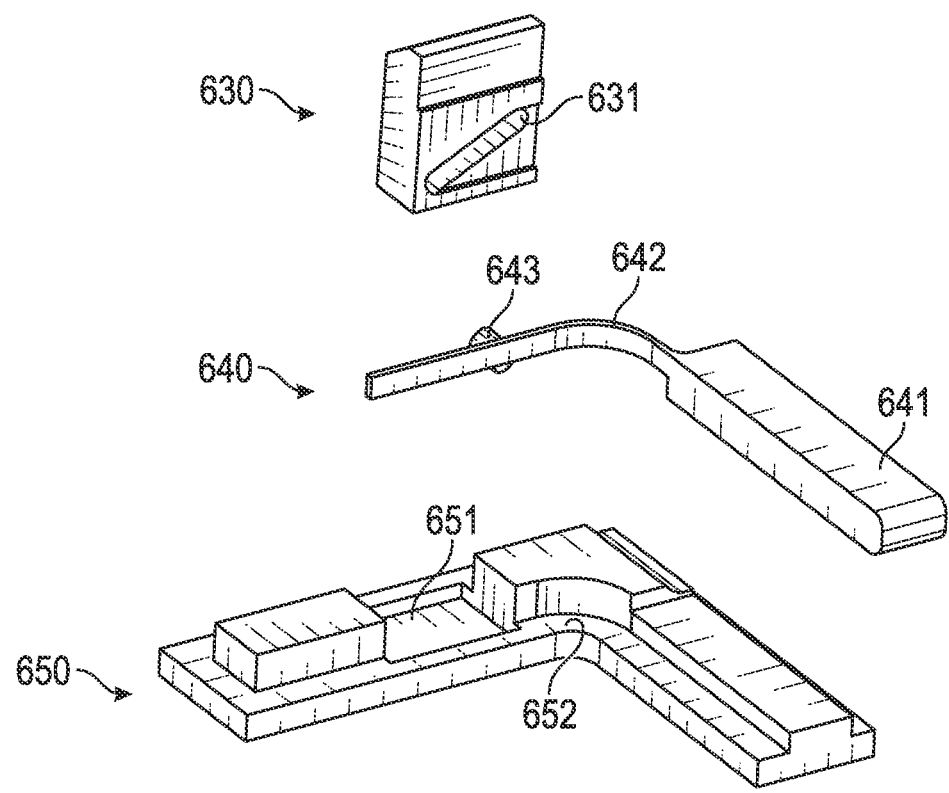
Figure 6F:
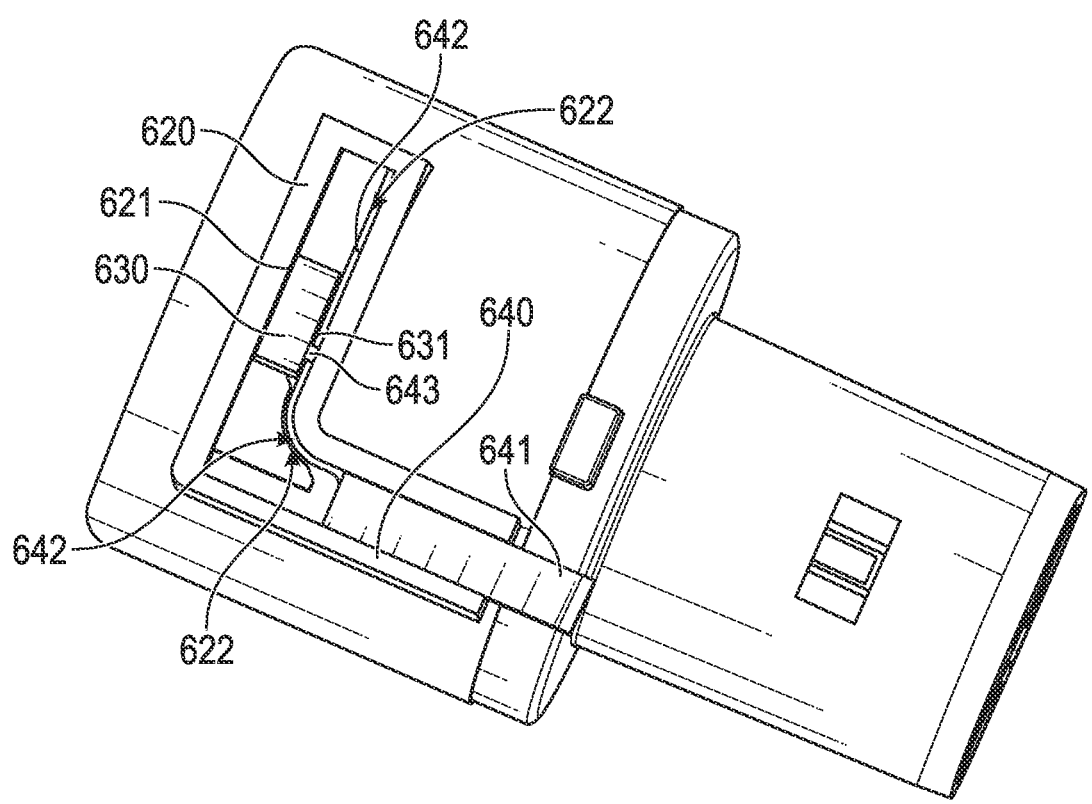

FIG. 6C also shows the components of locking mechanism 610 which include a housing 620, a locking tab 630, an actuator 640 and a cover 650. FIG. 6D shows housing 620 with the other components of locking mechanism removed. FIG. 6E shows locking tab 630, actuator 640 and cover 650 in isolation. FIG. 6F shows locking mechanism 610 when unengaged and with cover 650 removed. Housing 620 includes an opening 621 that can extend into the interior of end 111 and forms a channel 622 within which actuator 640 can slide. Cover 650 can include a notch 651 and channel 652 that align with opening 621 and channel 622.

Actuator 640 includes a button 641 which extends out from housing 620 and is oriented towards/against the EV when adapter 600 is inserted into the EV's charging port. In other words, the insertion of adapter 600 into the EV's charging port causes button 641 to be pressed. Actuator 640 also includes an arm 642 that extends from button 641 and is positioned within channel 622. A pin 643 may protrude from arm 642 and may be positioned in a slot 631 in locking tab 630. As best visualized in FIG. 6F, slot 631 is angled such that, when button 641 is pressed against the EV causing pin 643 to slide within slot 631, locking tab 630 is lifted through opening 621 where it can engage with a notch in the charging connector. Accordingly, a user could attach adapter 600 to a charging connector and then insert adapter 600 into the EV which will cause the charging connector to be locked to adapter 600. Then, once charging is initiated as described above, the EV's locking tab can insert into opening 123 to prevent adapter 600 from being removed from the EV's charging port. In this way, adapter 600 prevents the charging connector from being unintentionally or maliciously unplugged.

Figure 7A:
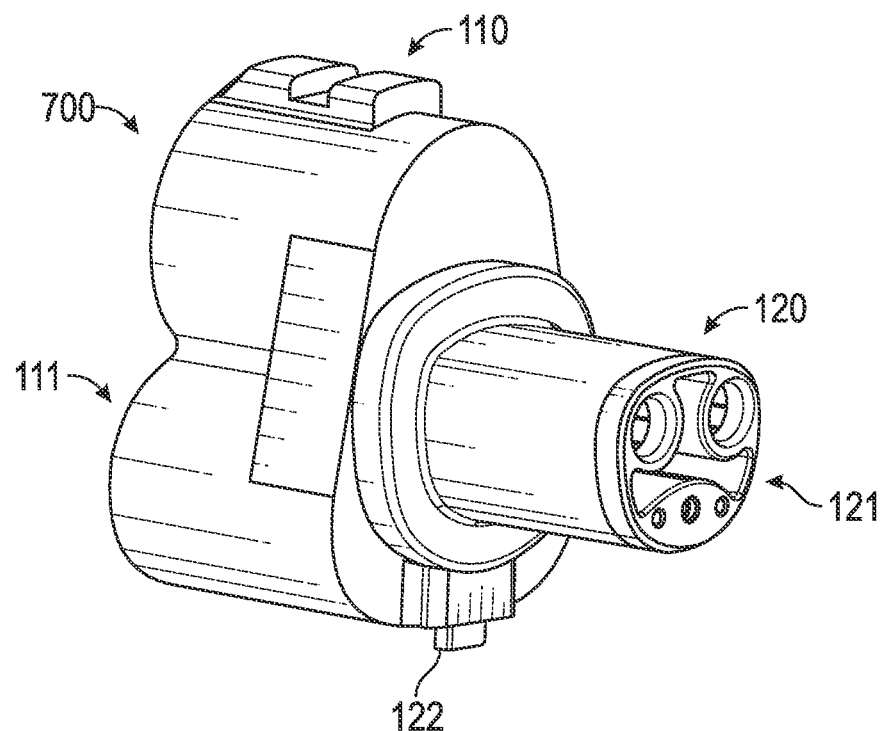
FIGS. 7A-7H are various views of another example of an adapter that is configured in accordance with embodiments of the present invention.
Figure 7B:
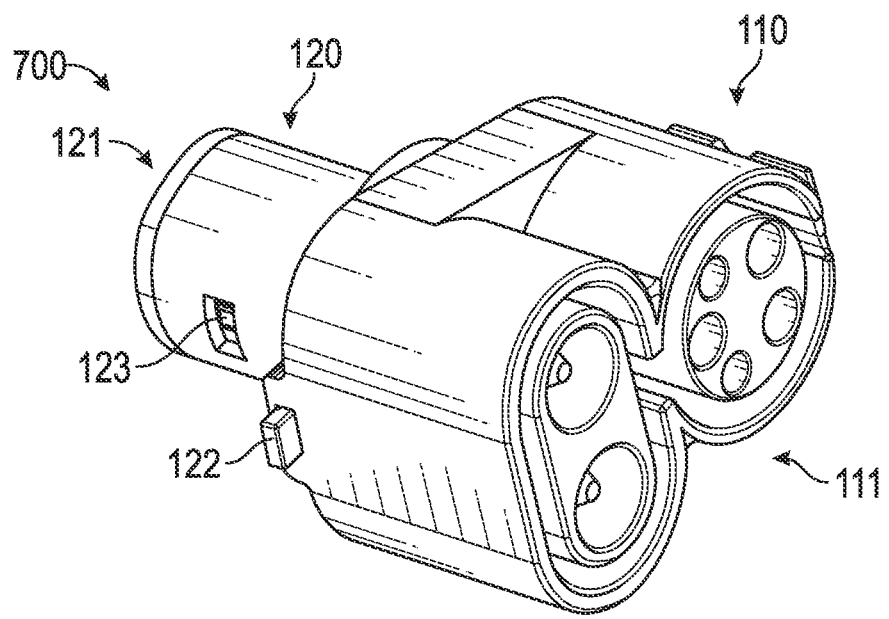

FIGS. 7A-7H provide another example of an adapter 700 that is configured in accordance with one or more embodiments of the present invention. Adapter 700 is similar to adapters 100 and 600 but is designed to allow an EV with a Tesla charging port to be charged using a CCS1 charging connector, which is commonly used for non-Tesla EVs. In particular, outer portion 110 has an end 111 that is configured to receive a CCS1 charging connector 800 as shown in FIG. 8. FIGS. 7A and 7B show that adapter 700 can include button 122 and opening 123 that are generally the same as described above.

Figure 7C:
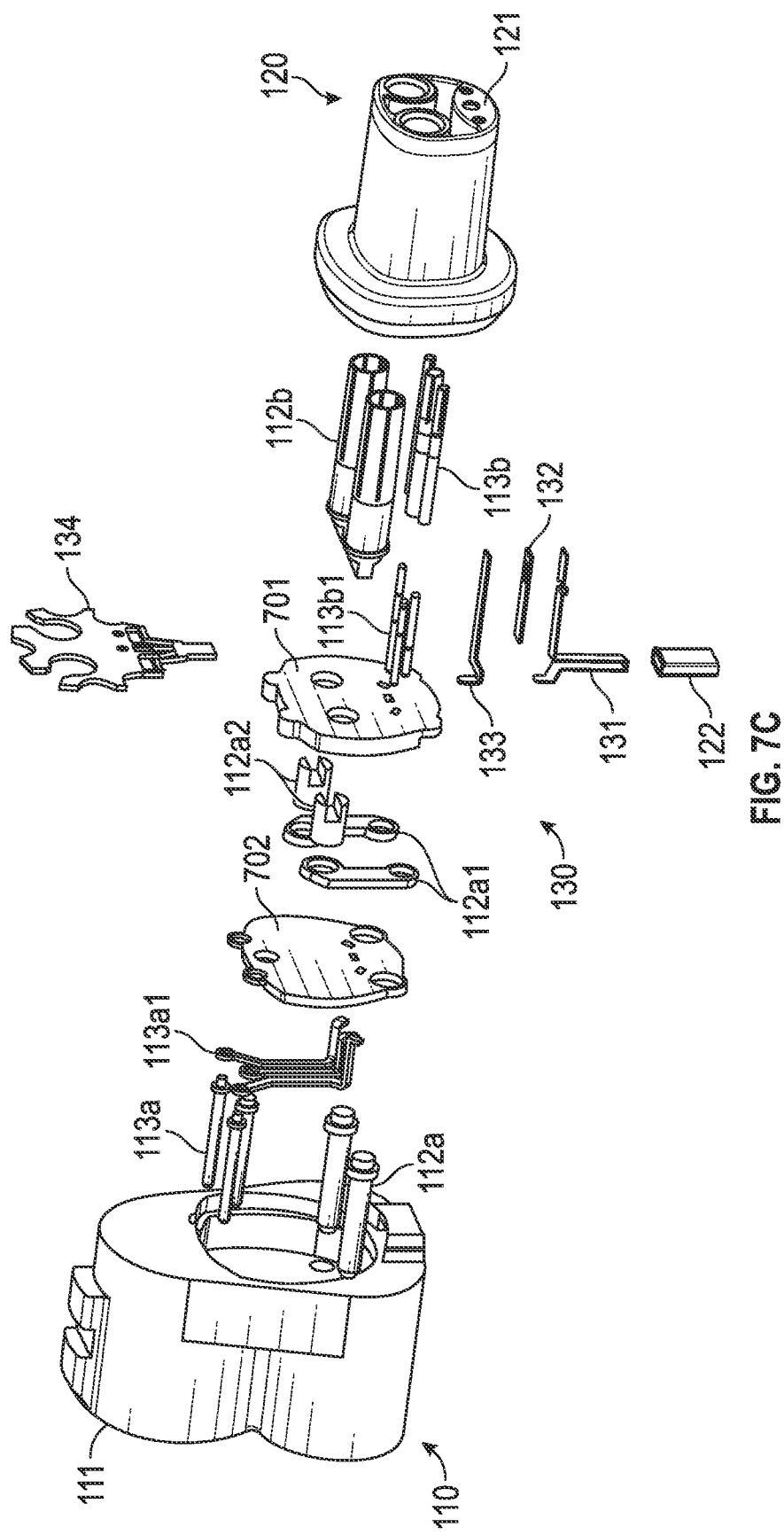
Figure 7D:
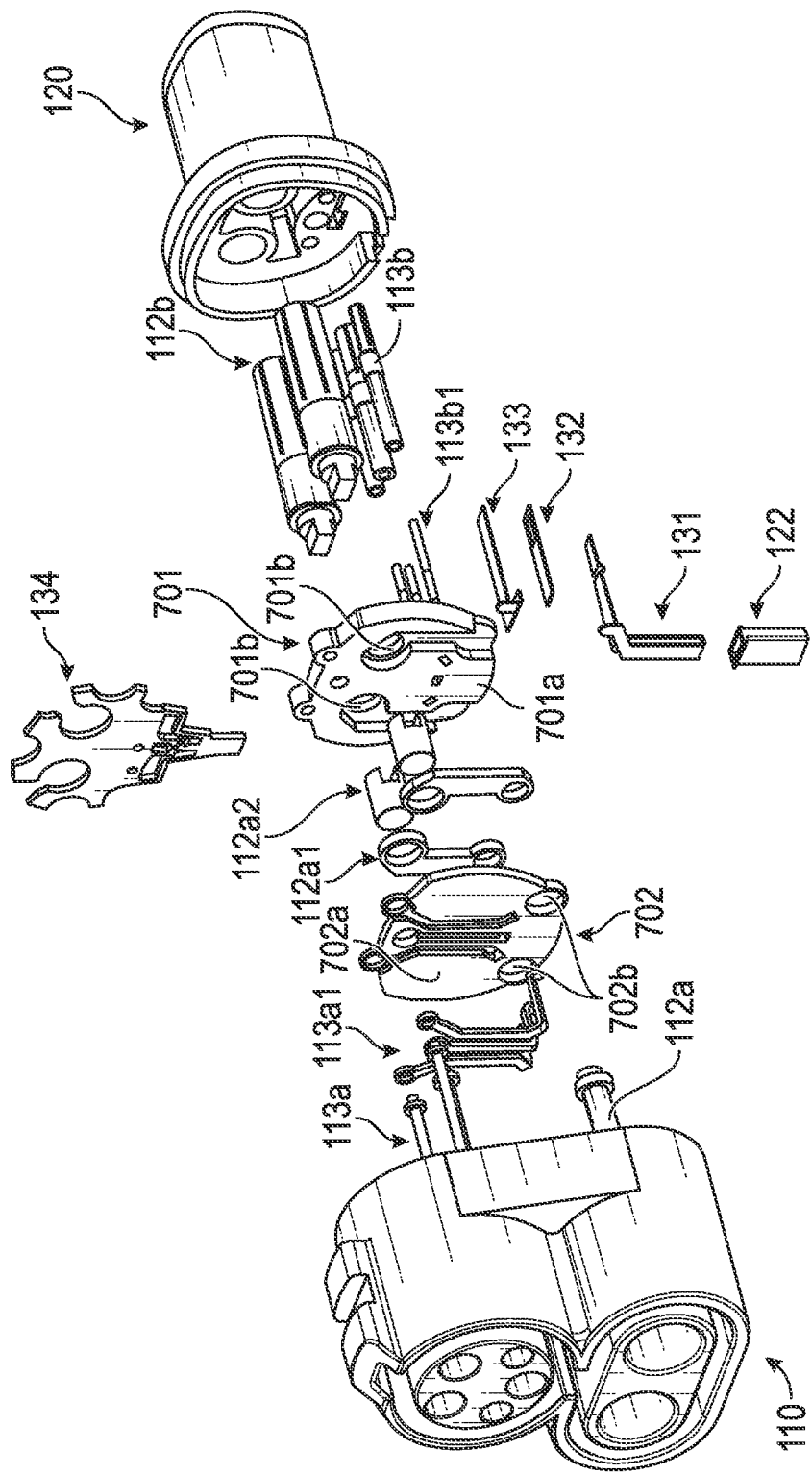
Figure 7E:
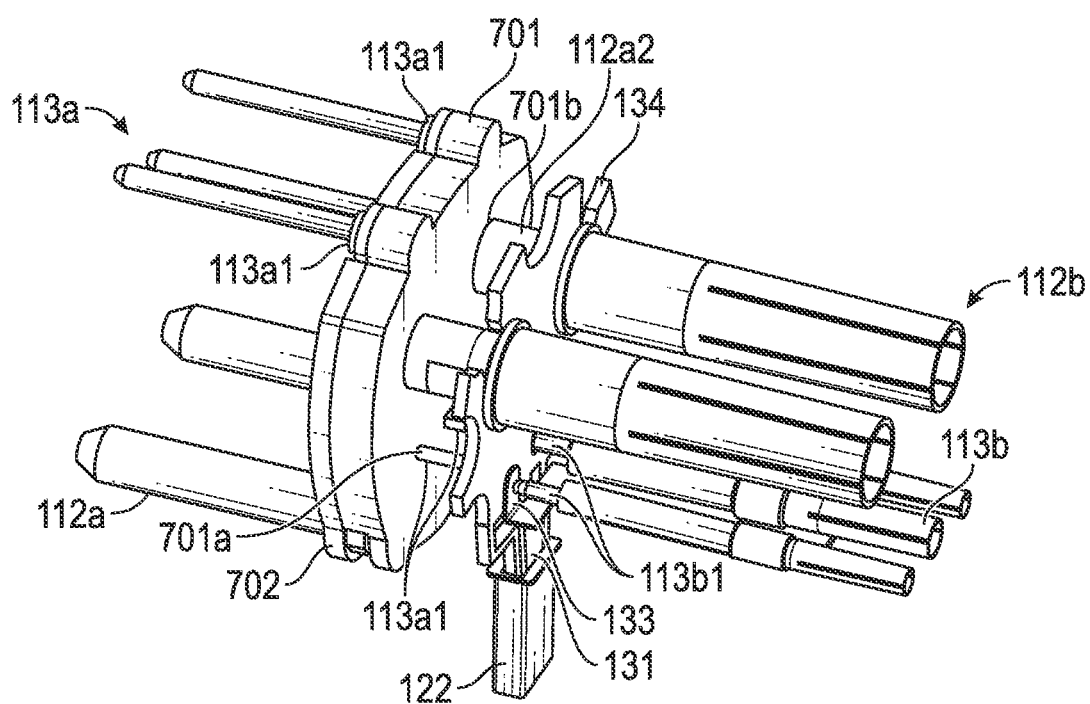
Figure 7F:
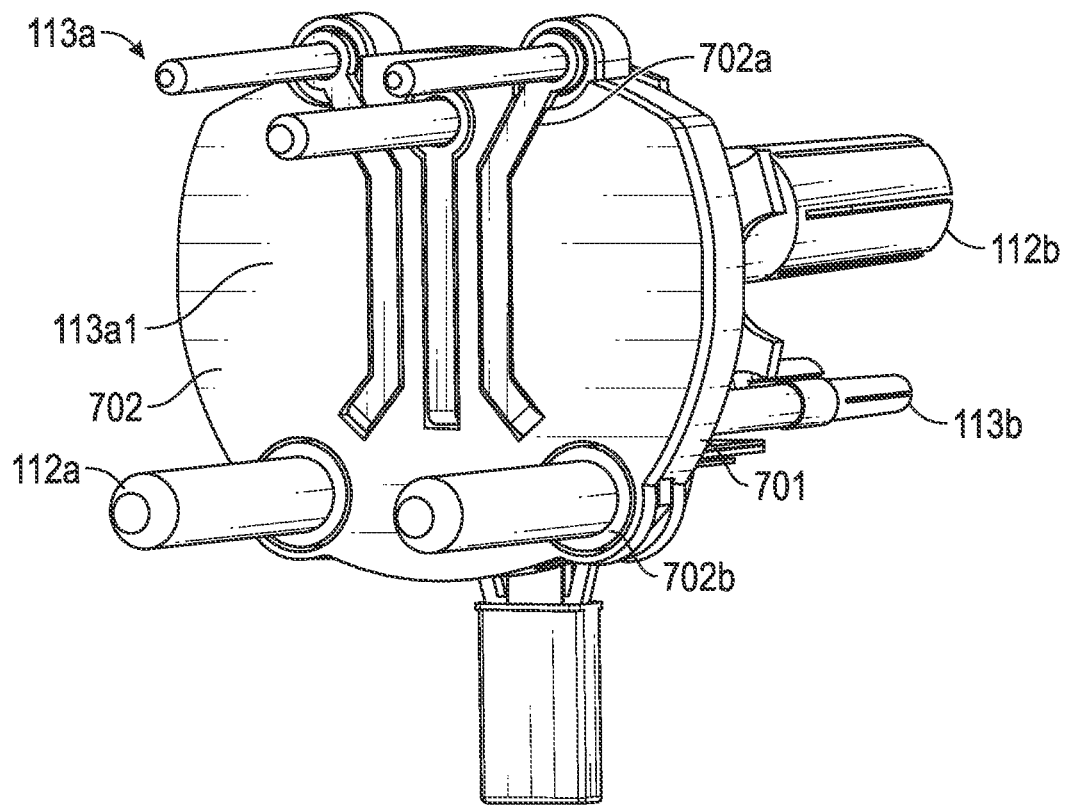
Figure 8:
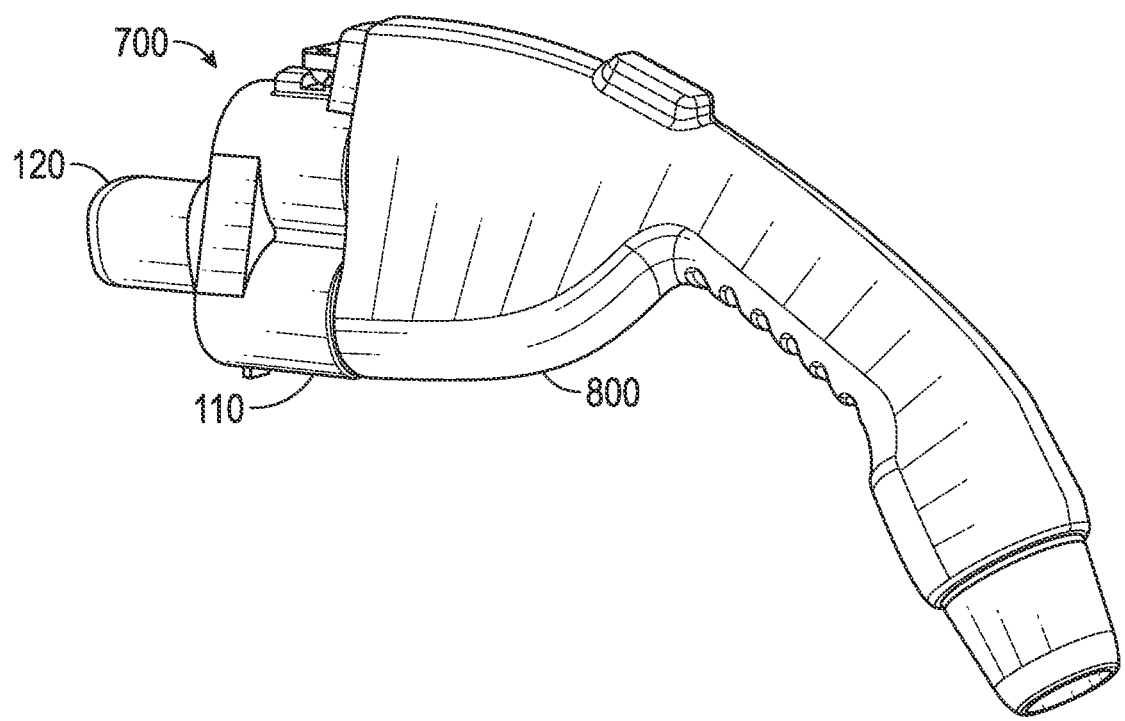
FIG. 8 shows the adapter of FIGS. 7A-7H when connected to a CCS1 charging connector.

FIGS. 7C and 7D are exploded views of adapter 700 and FIGS. 7E and 7F are isolated views of the internal components of adapter 700. Adapter 700 can include outer charging pin portions 112a, inner charging pin portions 112b, outer communication pin portions 113a, inner communication pin portions 113b and switching mechanism 130 similar to those of adapters 100 and 600. In the depicted embodiment, inner communication pin portions 113b also include spring-loaded extensions 113b1 similar to adapter 600. However, because the arrangement of the CCS1 pins is different from the arrangement of Tesla pins, adapter 700 can include additional components to form a breakaway connection between the respective pin portions.

In adapter 700, outer charging pin portions 112a include charging strips 112a1 and lugs 112a2. Charging strips 112a1 are configured to connect to outer charging pin portions 112a and extend upwardly to connect to lugs 112a2. Lugs 112a2 are configured to form a separable connection (e.g., a press fit) with inner charging pin portions 112b. Outer communication pin portions 113a include communication strips 113a1 which extend downwardly from outer communication pin portions 113a and then inwardly towards inner communication pin portions 113b. In the depicted embodiment, the inner ends of communication strips 113a1 are configured to contact spring-loaded extensions 113b1 (or first contact component 131). However, communication strips 113a1 could be configured to make contact with inner communication pin portions 113b in other manners such as using the opposing angled surfaces of adapter 100.

Figure 7G:
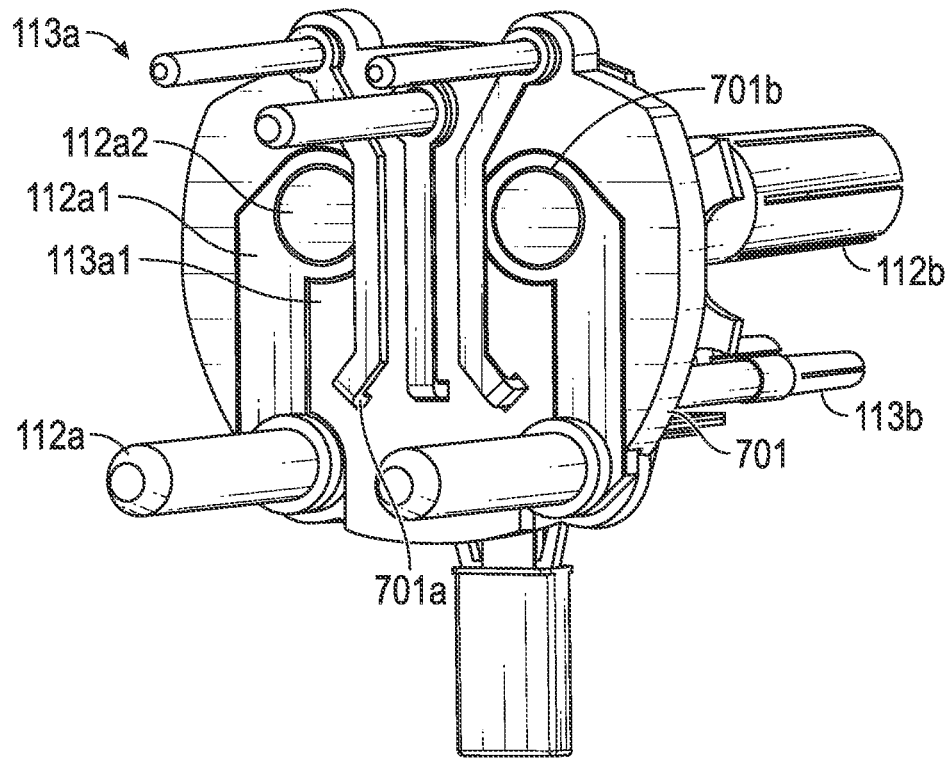

Adapter 700 also includes a power insulator 701 and a communication insulator 702 which function to physically and electrically separate charging strips 112a1 from communication strips 113a1. As best seen in FIG. 7G in which communication insulator 702 is removed, power insulator 701 may include openings 701a through which communication strips 113a1 extend and channels 701b in which charging strips 112a1 may be embedded. The top of channels 701b may include openings in which lugs 112a2 are housed. Similarly and is best seen in FIG. 7F, communication insulator 702 may include channels 702a in which communication strips 113a1 are embedded and openings 702b through which outer charging pin portions 112a extend. The bottom of channels 702a may include openings that align with openings 701a of power insulator 701 to allow communication strips 113a1 to pass through.

Figure 7H:
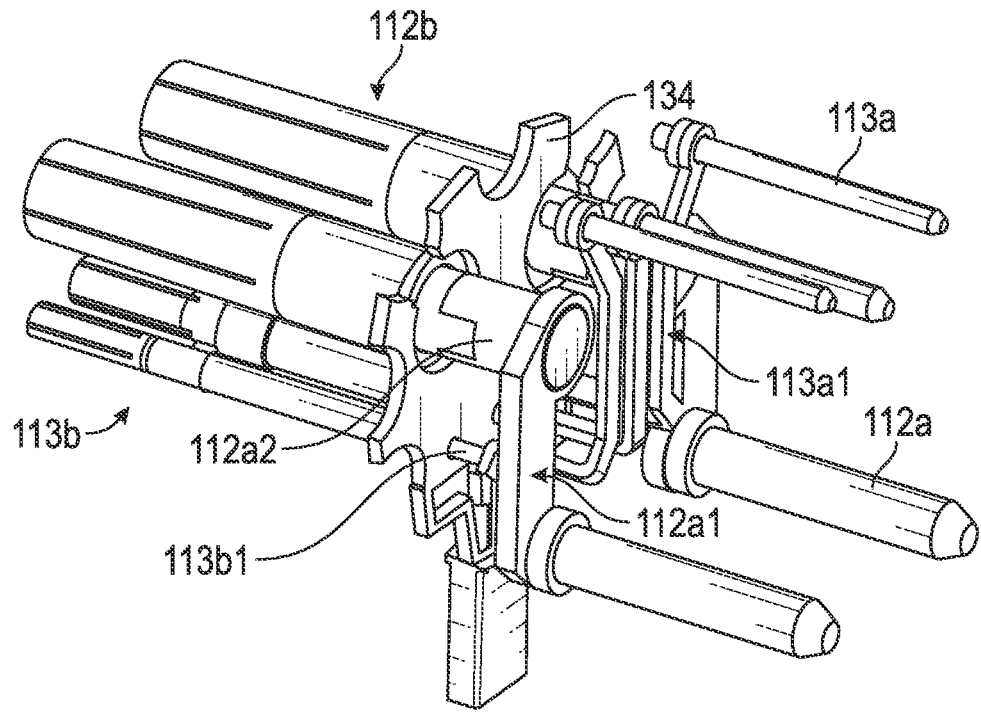

In FIG. 7H, power insulator 701 and communication insulator 702 are removed to better show how outer charging pin portions 112a and outer communication pin portions 113a can separate from inner charging pin portions 112b and inner communication pin portions 113b. When outer portion 110 separates from inner portion 120, such as when the driver drives away from the charging station while the charging connector is still plugged in via adapter 700, lugs 112a2 can be pulled off of inner charging pin portions 112b and communication strips 113a1 can simply pull away from spring-loaded extensions 113b1.

Figure 9A:
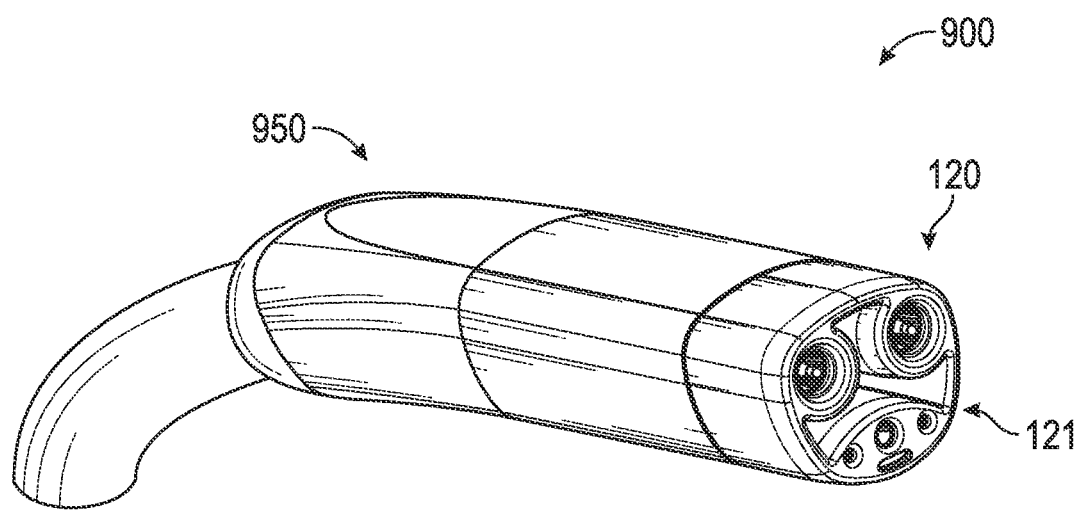
FIGS. 9A and 9B are assembled and exploded views respectively of an adapter that is integrated into a Tesla charging connector in accordance with embodiments of the present invention.
Figure 9B:
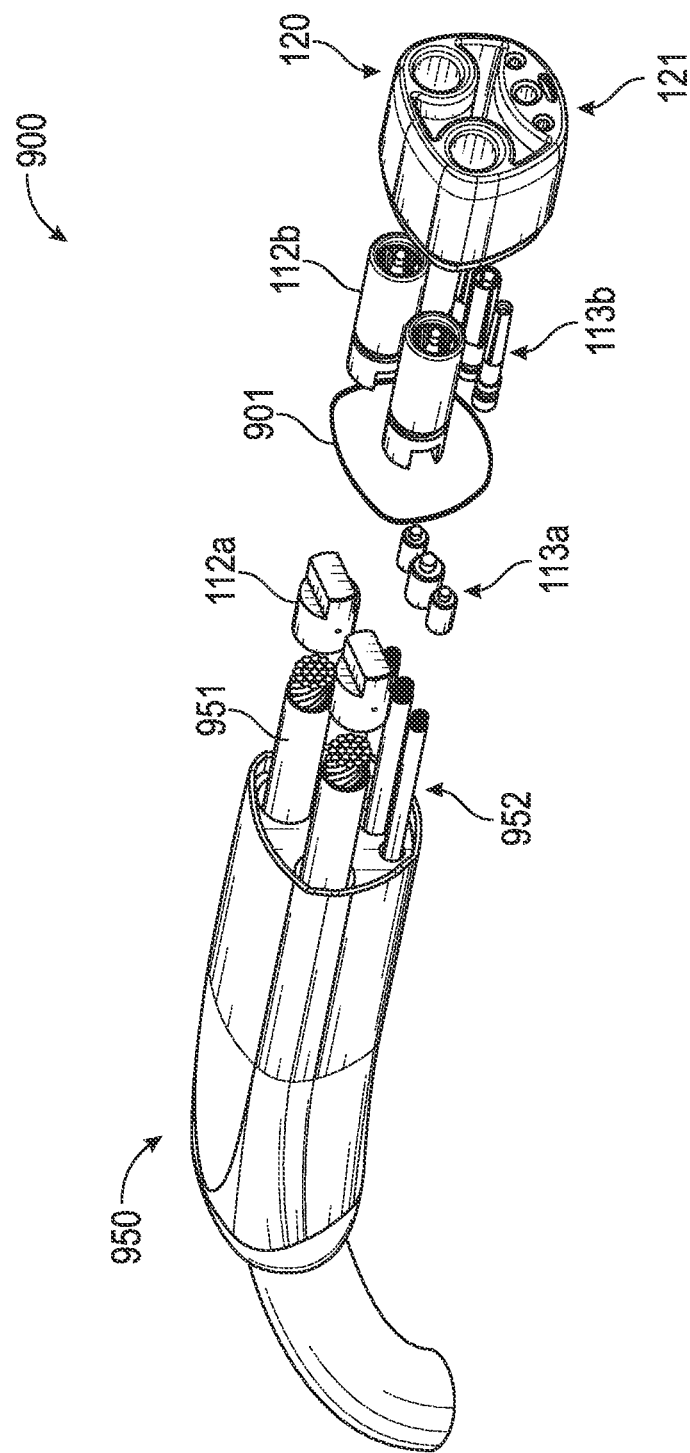

FIGS. 9A and 9B provide another example of an adapter 900 that is configured in accordance with embodiments of the present invention. Unlike the previously described adapters, adapter 900 is integrated into a charging connector 950, which in the depicted embodiment is the Tesla charging connector. However, an adapter could be configured to be integrated into the CCS1 or other charging connector in a similar manner as adapter 900.

Adapter 900 can include inner portion 120 having end 121 that is configured to insert into the EV's charging port. Inner portion 120 may selectively couple to the housing of charging connector 950 (e.g., via sonic welding) and may include a seal 901 to prevent water or other liquids from entering charging connector 950. Adapter 900 can also include inner charging pin portions 112b and inner communication pin portions 113b that are configured to selectively separate from outer charging pin portions 112a and outer communication pin portions 113a as described above. In the depicted embodiment, outer charging pin portions 112a form a press fit with inner charging pin portions 112b, and outer communication pin portions 113a include spring-loaded mechanisms for connecting with inner communication pin portions 113b. However, other breakaway connection techniques could be used such as those described above. In some embodiments, outer charging pin portions 112a and outer communication pin portions 113a may be coupled directly to charging wires 951 and communication wires 952 respectively of charging connector 950.

When adapter 900 is used, the EV can be configured to allow the driver to shift from park while charging connector 950 remains plugged in. Then, as the EV drives away, inner portion 120, including inner charging pin portions 112b and inner communication pin portions 113b, can separate from the remaining components. In some embodiments, a sleeve or other protective mechanism could be placed around the housing of charging connector 950 to provide protection when charging connector 950 falls to the ground. The broken-away adapter 900 or a new adapter 900 could then be attached to charging connector 950 to allow charging connector 950 to again be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. An adapter for an electric vehicle comprising:
   an inner portion configured to insert into a charging port of an electric vehicle;
   an outer portion configured to receive a charging connector designed to insert into the charging port of the electric vehicle such that the outer portion corresponds with the charging port of the electric vehicle; and
   a switching mechanism that is configured to selectively form a connection between a first outer communication pin portion and a first inner communication pin portion.

2. The adapter of claim 1, wherein the switching mechanism initially forms the connection via manual force and subsequently forms the connection via a locking tab of the electric vehicle.

3. The adapter of claim 1, wherein the inner portion includes inner charging pin portions and the outer portion includes outer charging pin portions that are connected to the inner charging pin portions, and wherein the outer charging pin portions are configured to separate from the inner charging pin portions when the outer portion of the adapter separates from the inner portion of the adapter.

4. The adapter of claim 3, wherein the outer charging pin portions are connected to the inner charging pin portions via a press fit.

5. The adapter of claim 3, wherein the outer charging pin portions include charging strips and lugs.

6. The adapter of claim 3, wherein the inner portion includes multiple inner communication pin portions and the outer portion includes multiple outer communication pin portions that are connected to the inner communication pin portions, and wherein the outer communication pin portions are configured to separate from the inner communication pin portions when the outer portion of the adapter separates from the inner portion of the adapter.

7. The adapter of claim 6, wherein the outer communication pin portions include communication strips.

8. The adapter of claim 1, wherein the switching mechanism includes a first contact component, a second contact component and a button for causing the first contact component to contact the second contact component to thereby form the connection between the first outer communication pin portion and the first inner communication pin portion.

9. The adapter of claim 8, wherein the inner portion of the adapter includes an opening through which a locking tab of the electric vehicle extends to force the first contact component into the second contact component.

10. The adapter of claim 1, further comprising:
    a locking mechanism configured to secure the charging connector within the outer portion of the adapter.

11. The adapter of claim 10, wherein the locking mechanism includes an actuator that is actuated when the adapter is inserted into the charging port.

12. An adapter for an electric vehicle comprising:
    an inner portion configured to insert into a charging port of an electric vehicle, the inner portion including inner charging pin portions and inner communication pin portions; and
    an outer portion configured to receive a charging connector designed to insert into the charging port of the electric vehicle such that the outer portion corresponds with the charging port of the electric vehicle, the outer portion including outer charging pin portions and outer communication pin portions that are connected to the inner charging pin portions and inner communication pin portions respectively;
    wherein the outer charging pin portions and outer communication pin portions are configured to separate from the inner charging pin portions and inner communication pin portions respectively when the outer portion of the adapter is separated from the inner portion of the adapter.

13. The adapter of claim 12, further comprising:
    a switching mechanism that is configured to selectively form a connection between a first outer communication pin portion of the outer communication pin portions and a first inner communication pin portion of the inner communication pin portions.

14. The adapter of claim 12, wherein the outer charging pin portions are connected to the inner charging pin portions via a press fit.

15. The adapter of claim 12, wherein the outer charging pin portions are connected to the inner charging pin portions via charging strips.

16. The adapter of claim 12, wherein the outer communication pin portions are connected to the inner communication pin portions via communication strips.

17. The adapter of claim 12, further comprising:
    a locking mechanism configured to secure the charging connector within the outer portion of the adapter.

18. An adapter for an electric vehicle comprising:
    an inner portion forming an end of a housing of a charging connector for the electric vehicle including being configured to insert into a charging port of the electric vehicle, the inner portion housing inner charging pin portions and inner communication pin portions, the inner portion being selectively coupled to the housing of the charging connector; and
    outer charging pin portions and outer communication pin portions that are secured within the housing of the charging connector;
    wherein the inner charging pin portions and inner communication pin portions are physically connected to the outer charging pin portions and outer communication pin portions respectively while the inner portion is coupled to the housing of the charging connector;
    wherein the inner charging pin portions and the inner communication pin portions are configured to separate from the outer charging pin portions and the outer communication pin portions respectively in response to the inner portion being broken away from the housing of the charging connector when the inner portion remains inserted in the electric vehicle as the electric vehicle drives away.

19. The adapter of claim 18, further comprising:
    a seal between the inner portion and the housing of the charging connector.

20. The adapter of claim 18, wherein the outer charging pin portions form a press fit with the inner charging pin portions, and the outer communication pin portions include spring-loaded mechanisms for connecting with the inner communication pin portions.

* * * * *